(12) United States Patent
Lin et al.

(10) Patent No.: US 12,455,278 B2
(45) Date of Patent: Oct. 28, 2025

(54) OPTICAL DETECTION DEVICE

(71) Applicant: PixArt Imaging Inc., Hsin-Chu (TW)

(72) Inventors: Yung-Chang Lin, Hsin-Chu (TW);
Che-Yen Kung, Hsin-Chu (TW);
Jian-Cheng Liao, Hsin-Chu (TW);
Hsiu-Ling Yeh, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 848 days.

(21) Appl. No.: 17/679,037

(22) Filed: Feb. 23, 2022

(65) Prior Publication Data

US 2023/0266297 A1 Aug. 24, 2023

(51) Int. Cl.
*G01N 33/49* (2006.01)
*A61B 5/1455* (2006.01)
*G01N 21/35* (2014.01)

(52) U.S. Cl.
CPC ..... *G01N 33/4925* (2013.01); *A61B 5/14552* (2013.01); *G01N 21/35* (2013.01)

(58) Field of Classification Search
CPC ............... G01N 33/4925; G01N 21/35; A61B 5/14552; A61B 5/14551; A61B 5/0059; A61B 5/681; A61B 5/6824
See application file for complete search history.

(56) References Cited

U.S. PATENT DOCUMENTS

2022/0142569 A1* 5/2022 Tsai ..................... G04G 17/08
2024/0090784 A1* 3/2024 Liu ..................... A61B 5/02416

FOREIGN PATENT DOCUMENTS

CN 209847153 U * 12/2019 ........... A61B 5/0064
WO WO 2021146333 A1 * 7/2021 ......... A61B 5/02427

* cited by examiner

*Primary Examiner* — Eric F Winakur
*Assistant Examiner* — Sienna C Pyle
(74) *Attorney, Agent, or Firm* — Winston Hsu

(57) ABSTRACT

An optical detection device is applied to an organism and includes a light emitting module, an optical detection module and an operation processor. The light emitting module includes a plurality of light emitters arranged along a first direction. The optical detection module includes a plurality of optical sensors arranged along a second direction and symmetrically relative to the light emitting module. The second direction is substantially different from the first direction. The optical sensors are substantially placed more outward from a center of the optical detection device than the light emitters. The operation processor is electrically connected to the optical detection module. The operation processor is adapted to analyze signal variation in the plurality of light emitters acquired by each of the plurality of optical sensors for determining a physiological feature of the organism.

15 Claims, 2 Drawing Sheets

OPTICAL DETECTION DEVICE

BACKGROUND OF THE INVENTION

1. Field of the Invention

The present invention relates to an optical detection device, and more particularly, to an optical detection device of determining a physiological feature of the organism.

2. Description of the Prior Art

A conventional wearable electronic product utilizes one optical sensor and two light sources to detect blood oxygen saturation. The two light sources are the red light emitter and the infrared light emitter. The red light emitter and the infrared light emitter alternately emit red light and infrared light toward the user's wrist, and the red light and the infrared light pierce through the skin to be reflected and absorbed by the blood in the vessel. Absorption quantity of the red light by oxyhemoglobin is different from absorption quantity of the infrared light by the oxyhemoglobin. The optical sensor analyzes the received red light and the received infrared light to acquire an absorption ratio of the red light to the infrared light by the oxyhemoglobin for generating blood oxygen saturation. However, the wearable electronic product may be tied on the user's wrist in different tightness due to consumer situations, and a wearing angle of the wearable electronic product may be unexpectedly lopsided. Detection accuracy of the wearable electronic product is affected by variation of the tightness and the wearing angle, and therefore design of a wearable electronic product capable of analyzing the tightness and the wearing angle to calibrate detection result is an important issue in the optical wearable industry.

SUMMARY OF THE INVENTION

The present invention provides an optical detection device of determining a physiological feature of the organism for solving above drawbacks.

According to the claimed invention, an optical detection device is applied to an organism and includes a light emitting module, an optical detection module and an operation processor. The light emitting module includes a plurality of light emitters arranged along a first direction. The optical detection module includes a plurality of optical sensors arranged along a second direction and symmetrically relative to the light emitting module. The second direction is substantially different from the first direction. The optical sensors are substantially placed more outward from a center of the optical detection device than the light emitters. The operation processor is electrically connected to the optical detection module. The operation processor is adapted to analyze signal variation in the plurality of light emitters acquired by each of the plurality of optical sensors for determining a physiological feature of the organism.

According to the claimed invention, the plurality of light emitters is surrounded by the plurality of optical sensors in symmetry. The physiological feature is wearing tightness of the organism wearing the optical detection device, the plurality of light emitters provides a first wavelength color beam, and a wavelength range of the first wavelength color beam is between 400~550 nm.

According to the claimed invention, the operation processor analyzes and transforms a detection signal acquired by the plurality of optical sensors via the first wavelength color beam into the wearing tightness. The detection signal is a perfusion index, and the operation processor analyzes at least one of intensity variation and an intensity varying speed of the detection signal to acquire the wearing tightness.

According to the claimed invention, the plurality of light emitters provides a second wavelength color beam, and a wavelength range of the second wavelength color beam is between 600~900 nm. The operation processor analyzes and transforms an intensity ratio of a first detection signal acquired by the plurality of optical sensors via the first wavelength color beam to a second detection signal acquired by the plurality of optical sensors via the second wavelength color beam into the wearing tightness.

According to the claimed invention, the first detection signal and second detection signal are perfusion indices, the operation processor analyzes at least one of intensity variation and an intensity varying speed of the intensity ratio to acquire the wearing tightness.

According to the claimed invention, the physiological feature is blood oxygen saturation of the organism wearing the optical detection device, a color beam provided by the plurality of light emitters has a wavelength ranged between 600~900 nm. The plurality of optical sensors comprises several first optical sensors located within a predefined range relative to the light emitting module, the operation processor computes first intensity difference between detection signals acquired by the first optical sensors to compare with a first predefined condition, and decide whether to output the blood oxygen saturation via the detection signals of the first optical sensors in accordance with a comparison result.

According to the claimed invention, when the first difference conforms to the first predefined condition, the operation processor analyzes a mean value or a weighted value of the detection signals of the first optical sensors to acquire the blood oxygen saturation.

According to the claimed invention, when the first difference does not conform to the first predefined condition, the operation processor computes second intensity difference between the detection signal acquired by the first optical sensor located within the predefined range and detection signal acquired by a second optical sensor located outside the predefined range to compare with a second predefined condition, and decide the blood oxygen saturation in accordance with a comparison result.

According to the claimed invention, the first optical sensor located within the predefined range and the second optical sensor located outside the predefined range are disposed on the same side of the light emitting module.

According to the claimed invention, when the second difference conforms to the second predefined condition, the operation processor analyzes the detection signal of the first optical sensor to acquire the blood oxygen saturation. A number of the first optical sensor located within the predefined range is plural, and the operation processor computes a mean value or a weighted value of the detection signals of the first optical sensors to acquire the blood oxygen saturation.

According to the claimed invention, when the second difference does not conform to the second predefined condition, the operation processor does not acquire the blood oxygen saturation by the detection signals of the first optical sensor and the second optical sensor.

According to the claimed invention, the light emitting module comprises two light emitter assemblies symmetrically arranged along the first direction, the optical detection module comprises two sensor assemblies arranged along the second direction and symmetrically on two opposite sides of the light emitting module, and each sensor assembly comprises two optical sensors symmetrically disposed on one side of the light emitting module along the first direction.

The preferred embodiment of the present invention can dispose two light emitter assemblies symmetrically arranged along the first direction in the light emitting module, and dispose two sensor assemblies symmetrically arranged on opposite sides of the light emitting module and along the second direction in the optical detection module. Each light emitter assembly can include the short wavelength light emitter, the long wavelength visible light emitter, and the long wavelength invisible light emitter. Each sensor assembly can include two optical sensors disposed by the side of the two light emitter assemblies and symmetrically arranged along the first direction. The optical detection device can utilize the optical detection module to acquire the detection signal of the short wavelength light emitter for analyzing and transforming into the wearing tightness, or utilize the optical detection module to acquire the detection signals of the short wavelength light emitter and the long wavelength light emitter for analyzing and transforming into the wearing tightness. Besides, the optical detection device can analyze the detection signals of the far-distance optical sensor and the near-distance optical sensor of the optical detection module, so as to determine whether the wearing angle of the optical detection device is lopsided for increasing the detection accuracy of the blood oxygen saturation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
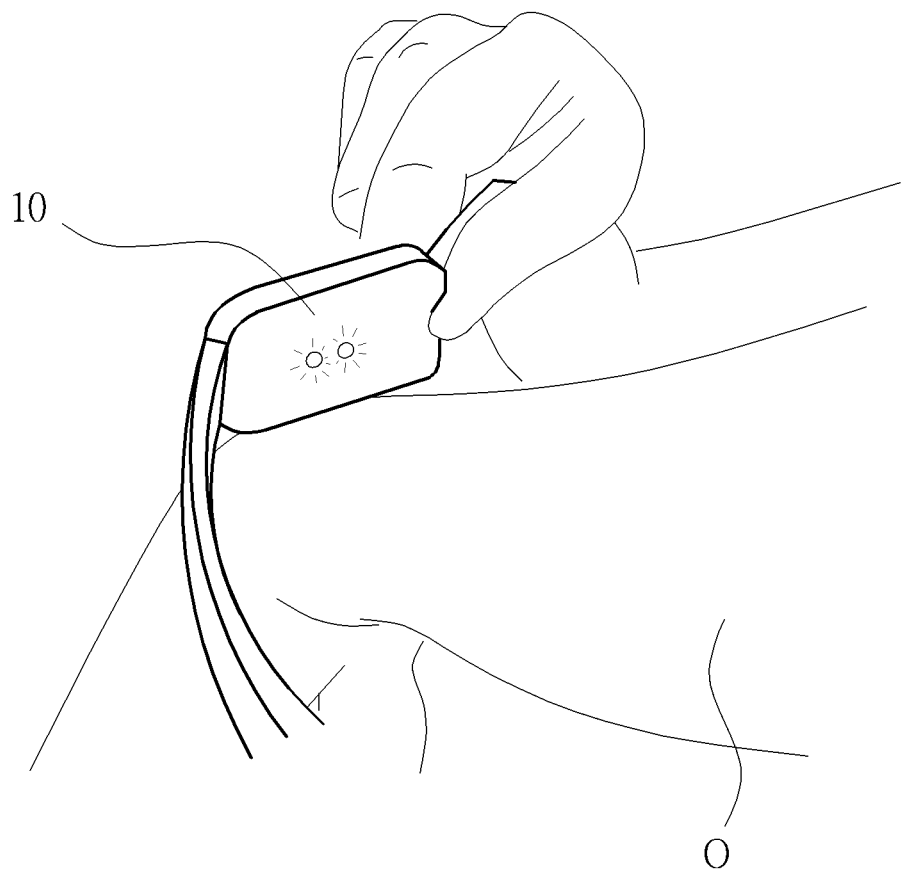
FIG. 1 and FIG. 2 are diagrams of an optical detection device in different views according to an embodiment of the present invention.
Figure 2:
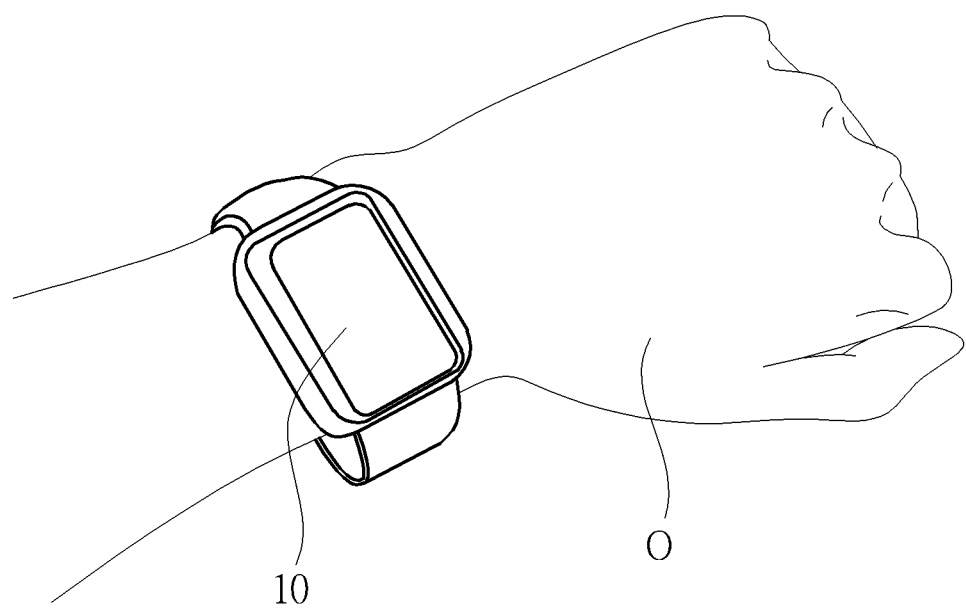

Please refer to FIG. 1 and FIG. 2. FIG. 1 and FIG. 2 are diagrams of an optical detection device 10 in different views according to an embodiment of the present invention. The optical detection device 10 can be worn on an organism O, and acquire a physiological feature of the organism O via optical detection technique. The optical detection device 10 can be a smart watch, and the organism O can be a wrist, which depends on the actual demand. A watchcase of the optical detection device 10 can be kept on the wrist via a watchstrap. The watchstrap of the optical detection device 10 can be adjusted to tie the watchcase on the wrist; even so, a wearing angle of the optical detection device 10 may be still lopsided due to many reasons, and the optical detection device 10 of the present invention can automatically eliminate an incorrect detection result to increase detection accuracy of the physiological feature. The physiological feature can be wearing tightness or blood oxygen saturation of the organism O who wears the optical detection device 10, and may be other detection results of the organism O in accordance with a function of the optical detection device 10.

Figure 3:
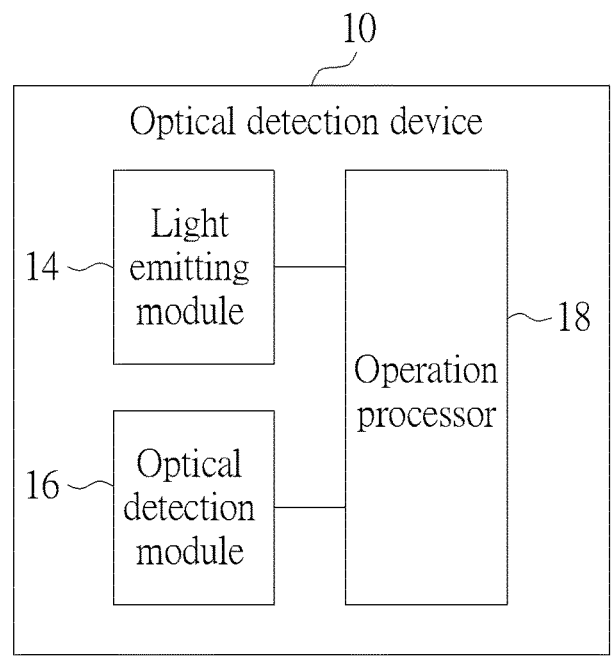
FIG. 3 is a functional block diagram of the optical detection device according to the embodiment of the present invention.
Figure 4:
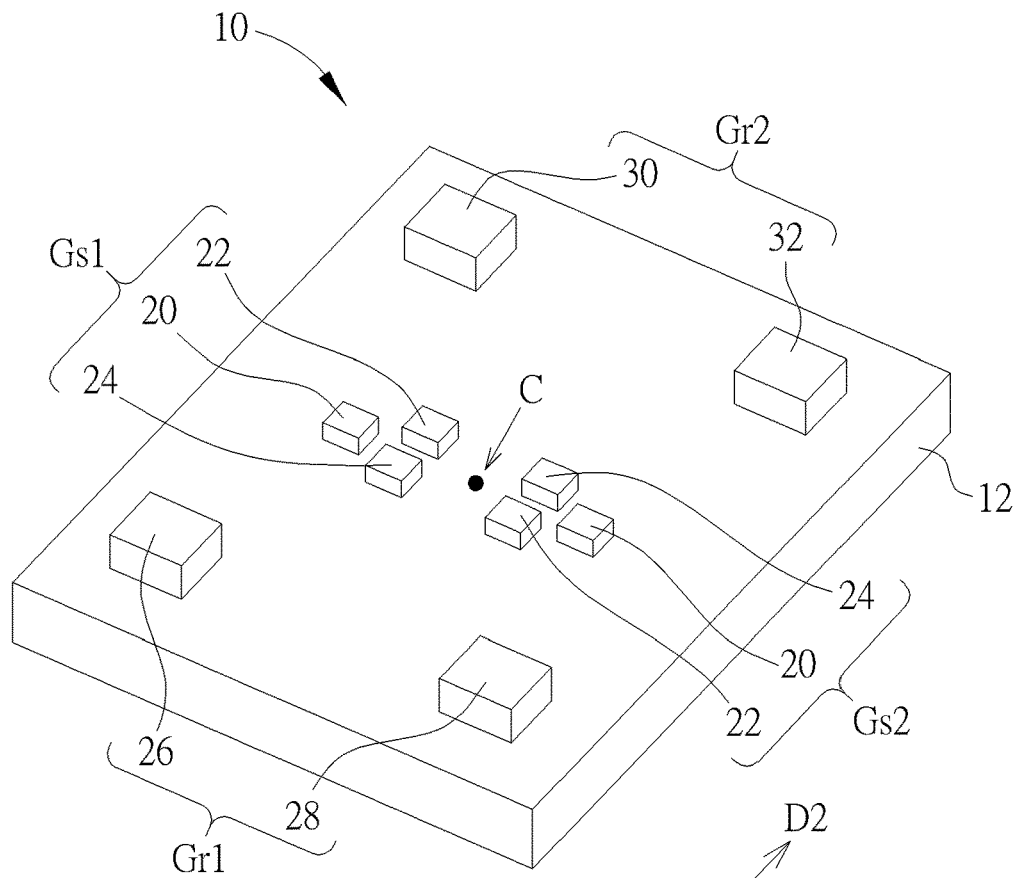
FIG. 4 is an application diagram of the optical detection device according to the embodiment of the present invention.

Please refer to FIG. 3 and FIG. 4. FIG. 3 is a functional block diagram of the optical detection device 10 according to the embodiment of the present invention. FIG. 4 is an application diagram of the optical detection device 10 according to the embodiment of the present invention. The optical detection device 10 can include a circuit board 12, a light emitting module 14, an optical detection module 16 and an operation processor 18. The light emitting module 14 can include several light emitter assemblies arranged along a first direction D1 and disposed on the circuit board 12, such as a first light emitter assembly Gs1 and a second light emitter assembly Gs2 shown in FIG. 4. The optical detection module 16 can include several sensor assemblies arranged along a second direction D2 and disposed on the circuit board 12, such as a first sensor assembly Gr1 and a second sensor assembly Gr2 shown in FIG. 4. The first direction D1 can be substantially different from the second direction D2. In the embodiment of the present invention, the first direction D1 can be preferably perpendicular to the second direction D2.

The operation processor 18 can be disposed on the circuit board 12, and electrically connected to the light emitting module 14 and the optical detection module 16. The light emitting module 14 can be switched on and off via the operation processor 18. In addition, the operation processor 18 can compute signal variation of the first light emitter assembly Gs1 and the second light emitter assembly Gs2 detected by the first sensor assembly Gr1 and the second sensor assembly Gr2, and analyze the signal variation to determine the physiological feature of the organism O. In the present invention, the first light emitter assembly Gs1 and the second light emitter assembly Gs2 can be surrounded by the first sensor assembly Gr1 and the second sensor assembly Gr2 in symmetry; that is to say, distances of the first sensor assembly Gr1 and the second sensor assembly Gr2 relative to a center C of the optical detection device 10 can be greater than distances of the first light emitter assembly Gs1 and the second light emitter assembly Gs2 relative to the center C of the optical detection device 10. The foresaid center C can be interpreted as the center C of the circuit board 12 or the center C of the light emitter assemblies.

In the present invention, each light emitter assembly of the light emitting module 14 (such as the first light emitter assembly Gs1 and the second light emitter assembly Gs2) can include a first light emitter 20, a second light emitter 22 and a third light emitter 24. The first light emitter 20 can provide a first wavelength color beam, and a wavelength range of the first wavelength color beam can be set between 400-550 nm. The first light emitter 20 is a green light emitter. The second light emitter 22 and the third light emitter 24 can provide a second wavelength color beam, and a wavelength range of the second wavelength color beam can be set between 600-900 nm; moreover, the wavelength range of the second light emitter 22 can be set between 600-750 nm and the second light emitter 22 is a red light emitter, and the wavelength range of the third light emitter 24 can be set between 760-900 nm and the third light emitter 24 is an infrared light emitter. The second light emitter 22 and the third light emitter 24 can alternately emit the red light and the infrared light toward the organism O. The red light and the infrared light can pierce through the skin to be reflected and absorbed by blood in the vessel. Absorption quantity of the red light by oxyhemoglobin is different from absorption quantity of the infrared light by oxyhemoglobin. The operation processor 18 can utilize the optical detection module 16 to acquire and compute an absorption ratio of the red light to the infrared light to generate the blood oxygen saturation.

Each sensor assembly of the optical detection module 16 can include several optical sensors disposed by each of the light emitter assemblies. For example, the first sensor assembly Gr1 can include optical sensors 26 and 28, and the second sensor assembly Gr2 can include optical sensors 30 and 32. The optical sensors 26 and 30 can be respectively disposed on two opposite sides of the first light emitter assembly Gs1. The optical sensors 28 and 32 can be respectively disposed on two opposite sides of the second light emitter assembly Gs2. The optical sensors 26, 28, 30 and 32 can be substantially placed more outward from the center C of the optical detection device 10 than the light emitters 20, 22 and 24. The center C can be set between the first light emitter assembly Gs1 and the second light emitter assembly Gs2. The distance of each of the optical sensors 26, 28, 30 and 32 relative to the center C can be greater than the distance of each of the first light emitter assembly Gs1 and the second light emitter assembly Gs2 relative to the center C. Besides, the distance of the optical sensor 26 relative to the center C can be preferably the same as or similar to the distance of the optical sensor 30 relative to the center C; accordingly, the distance of the optical sensor 28 relative to the center C can be preferably the same as or similar to the distance of the optical sensor 32 relative to the center C.

The present invention can utilize the first light emitter 20 that has the short wavelength color beam in each light emitter assembly (which means the first light emitter assembly Gs1 and the second light emitter assembly Gs2) to acquire the wearing tightness of the organism O who wears the optical detection device 10. A depth of the long wavelength color beam provided by the second light emitter 22 and the third light emitter 24 into the skin can be deeper than a depth of the short wavelength color beam provided by the first light emitter 20 into the skin. The operation processor 18 can analyze the detection signal of the first wavelength color beam (which means the short wavelength color beam) acquired by the optical detection module 16 to transform into the wearing tightness. The detection signal may be interpreted as a perfusion index (PI) and used to indicate blood perfusion ability. The perfusion index is proportional to the blood flow in the vessel, so that the optical detection device 10 can determine pressure applied to the blood vessel via the perfusion index and therefore acquire the wearing tightness.

When the organism O is not tightly tied by the optical detection device 10, the blood flow in the vessel is enlarged, and the perfusion index can be increased accordingly; when the organism O is tightly tied by the optical detection device 10, the blood flow in the vessel is reduced, and therefore the perfusion index can be decreased. The operation processor 18 can analyze at least one of intensity variation and intensity varying speed of the perfusion index acquired by the short wavelength color beam to determine the wearing tightness. The intensity variation can be interpreted as the dropping amplitude of the perfusion index acquired by the short wavelength color beam. The intensity varying speed can be interpreted as the dropping speed of the perfusion index acquired by the short wavelength color beam. The embodiment can determine the wearing tightness of the optical detection device 10 by only analyzing the perfusion index of the short wavelength color beam.

Further, the present invention may optionally analyze detection signals of the first light emitter 20 that has the short wavelength color beam and at least one of the second light emitter 22 and the third light emitter 24 that have the long wavelength color beam in each light emitter assembly (which means the first light emitter assembly Gs1 and the second light emitter assembly Gs2), so as to acquire the wearing tightness. The operation processor 18 can analyze an intensity ratio of the first detection signal of the first wavelength color beam (which means the short wavelength color beam) to the second detection signal of the second wavelength color beam (which means the long wavelength color beam) via the optical detection module 16, and transform the intensity ratio into the wearing tightness. For example, the optical detection device 10 can compute the intensity ratio of the green light perfusion index to the red light perfusion index, or the intensity ratio of the green light perfusion index to the infrared light perfusion index, or the intensity ratios of the green light perfusion index respectively to the red light perfusion index and the infrared light perfusion index. At least one of the intensity variation and the intensity varying speed of the foresaid intensity ratios can be transformed into the wearing tightness. The intensity variation can be interpreted as the dropping amplitude of an absolute value of the foresaid ratio of the perfusion indices acquired by different color beams. The intensity varying speed can be interpreted as the dropping speed of an absolute value of the foresaid ratio of the perfusion indices acquired by different color beams.

The present invention can utilize the optical detection module 16 to detect the detection signals from the second light emitter 22 and the third light emitter 24, so as to acquire the blood oxygen saturation of the organism O who wears the optical detection device 10. The second light emitter 22 and the third light emitter 24 can provide the second wavelength color beam, which belongs to the long wavelength range set between 600-900 nm. The optical detection device 10 can utilize several optical sensors that are far from and close to at least one of the first light emitter assembly Gs1 and the second light emitter assembly Gs2 to increase the detection accuracy. As an example of the first light emitter assembly Gs1, the optical sensors 28 and 32 that are far from the first light emitter assembly Gs1 can be defined as first optical sensors conforming to a predefined range, and the optical sensors 26 and 30 that are close to the first light emitter assembly Gs1 can be defined as second optical sensors not conforming to the predefined range. An actual value of the predefined range is not limited and can be varied in accordance with an interval between related components of the optical detection device 10.

In the example of the first light emitter assembly Gs1, the optical detection device 10 can analyze a ratio of the detection signal acquired by the far-distance optical sensor 28 to the detection signal acquired by the far-distance optical sensor 32 to compute first intensity difference, and then compare the first intensity difference with a first predefined condition. If the detection signal acquired by the far-distance optical sensor 28 is the same as or similar to the detection signal acquired by the far-distance optical sensor 32, the foresaid detection signals have preferred detection accuracy and can be transformed into the blood oxygen saturation. Therefore, the first predefined condition can be set as one percent or other similar low percentage; when the first intensity difference conforms to the first predefined condition, the detection signals of the two far-distance optical sensors 28 and 32 are similar, and the optical detection device 10 can compute a mean value or a weighted value of the detection signals to set as the blood oxygen saturation.

When the first intensity difference does not conform to the first predefined condition, the detection signals of the two far-distance optical sensors 28 and 32 are different, and the wearing angle of the optical detection device 10 may be lopsided, so that the optical detection device 10 can analyze a ratio of the detection signal acquired by the near-distance optical sensor 26 to the detection signal acquired by the near-distance optical sensor 28 to compute second intensity difference, and compare the second intensity difference with a second predefined condition; the optical sensors 26 and 28 are disposed on the same side of the first light emitter assembly Gs1. The second predefined condition can be used to decide difference between the far-distance blood oxygen saturation and the near-distance blood oxygen saturation, and may be set as two percent or other similar low percentage. When the second intensity difference conforms to the second predefined condition, the second intensity difference is lower than two percent, and the far-distance blood oxygen saturation and the near-distance blood oxygen saturation are the same or similar to each other, so that the optical detection device 10 can transform the detection signal of the far-distance optical sensor 28 into the blood oxygen saturation. When the second intensity difference does not conform to the second predefined condition, the far-distance blood oxygen saturation and the near-distance blood oxygen saturation are obviously different, and the wearing angle of the optical detection device 10 is lopsided, so that the optical detection device 10 does not utilize the detection signals of the near-distance optical sensor 26 and the far-distance optical sensor 28 to acquire the blood oxygen saturation.

The optical detection device 10 can further analyze a ratio of the detection signal acquired by the near-distance optical sensor 30 to the detection signal acquired by the far-distance optical sensor 32 to compute another second intensity difference, and then compare the second intensity difference with the second predefined condition; the optical sensors 30 and 32 are disposed on another side of the first light emitter assembly Gs1. When the second intensity difference (which is relevant to the optical sensors 30 and 32) conforms to the second predefined condition, the optical detection device 10 can transform the detection signal of the far-distance optical sensor 32 into the blood oxygen saturation; if the second intensity difference relevant to the optical sensors 26 and 28 also conforms to the second predefined condition, the optical detection device 10 can compute the mean value or the weighted value of the detection signals of the far-distance optical sensors 28 and 32 to transform into the blood oxygen saturation. When the second intensity difference does not conform to the second predefined condition, the optical detection device 10 does not utilize the detection signals of the near-distance optical sensor 30 and the far-distance optical sensor 32 to acquire the blood oxygen saturation.

In conclusion, the preferred embodiment of the present invention can dispose two light emitter assemblies symmetrically arranged along the first direction in the light emitting module, and dispose two sensor assemblies symmetrically arranged on opposite sides of the light emitting module and along the second direction in the optical detection module. Each light emitter assembly can include the short wavelength light emitter, the long wavelength visible light emitter, and the long wavelength invisible light emitter. Each sensor assembly can include two optical sensors disposed by the side of the two light emitter assemblies and symmetrically arranged along the first direction. The optical detection device can utilize the optical detection module to acquire the detection signal of the short wavelength light emitter for analyzing and transforming into the wearing tightness, or utilize the optical detection module to acquire the detection signals of the short wavelength light emitter and the long wavelength light emitter for analyzing and transforming into the wearing tightness. Besides, the optical detection device can analyze the detection signals of the far-distance optical sensor and the near-distance optical sensor of the optical detection module, so as to determine whether the wearing angle of the optical detection device is lopsided for increasing the detection accuracy of the blood oxygen saturation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detection device configured to be applied to an organism, comprising:
    a light emitting module comprising a plurality of light emitters arranged along a first direction, the plurality of light emitters provides a first wavelength color beam and a second wavelength color beam;
    an optical detection module comprising a plurality of optical sensors arranged along a second direction and symmetrically relative to the light emitting module, the second direction being different from the first direction, wherein the optical sensors are placed more outward from a center of the optical detection device than the light emitters; and
    an operation processor electrically connected to the optical detection module, the operation processor being adapted to analyze and transform an intensity ratio of a first detection signal acquired by the plurality of optical sensors via the first wavelength color beam to a second detection signal acquired by the plurality of optical sensors via the second wavelength color beam into a physiological feature of the organism;
    wherein the physiological feature is wearing tightness of the organism wearing the optical detection device.

2. The optical detection device of claim 1, wherein the plurality of light emitters is surrounded by the plurality of optical sensors in symmetry.

3. The optical detection device of claim 1, wherein a wavelength range of the first wavelength color beam is between 400~550 nm.

4. The optical detection device of claim 3, wherein a wavelength range of the second wavelength color beam is between 600~900 nm.

5. The optical detection device of claim 4, wherein the first detection signal and second detection signal are perfusion indices, the operation processor analyzes at least one of intensity variation and an intensity varying speed of the intensity ratio to acquire the wearing tightness.

6. The optical detection device of claim 1, wherein the detection signal is a perfusion index, and the operation processor analyzes at least one of intensity variation and an intensity varying speed of the detection signal to acquire the wearing tightness.

7. The optical detection device of claim 1, wherein the plurality of light emitters are configured to emit red light and infrared light between 600~900 nm, and the operation processor is further adapted to analyze and transform an absorption ratio of detection signals corresponding to the red light to the infrared light into a blood oxygen saturation of the organism wearing the optical detection device.

8. The optical detection device of claim 7, wherein the plurality of optical sensors comprises several first optical sensors located within a predefined range relative to the light emitting module, the operation processor computes first intensity difference between detection signals acquired by the first optical sensors to compare with a first predefined condition, and decide whether to output the blood oxygen saturation via the detection signals of the first optical sensors in accordance with a comparison result.

9. The optical detection device of claim 8, wherein when the first intensity difference conforms to the first predefined condition, the operation processor analyzes a mean value or a weighted value of the detection signals of the first optical sensors to acquire the blood oxygen saturation.

10. The optical detection device of claim 8, wherein when the first intensity difference does not conform to the first predefined condition, the operation processor computes second intensity difference between the detection signal acquired by the first optical sensor located within the predefined range and detection signal acquired by a second optical sensor located outside the predefined range to compare with a second predefined condition, and decide the blood oxygen saturation in accordance with a comparison result.

11. The optical detection device of claim 10, wherein the first optical sensor located within the predefined range and the second optical sensor located outside the predefined range are disposed on the same side of the light emitting module.

12. The optical detection device of claim 10, wherein when the second intensity difference conforms to the second predefined condition, the operation processor analyzes the detection signal of the first optical sensor to acquire the blood oxygen saturation.

13. The optical detection device of claim 12, wherein the first optical sensor located within the predefined range is made up of a plurality of optical sensors, and the operation processor computes a mean value or a weighted value of the detection signals of the first optical sensors to acquire the blood oxygen saturation.

14. The optical detection device of claim 10, wherein when the second intensity difference does not conform to the second predefined condition, the operation processor does not acquire the blood oxygen saturation by the detection signals of the first optical sensor and the second optical sensor.

15. The optical detection device of claim 7, wherein the light emitting module comprises two light emitter assemblies symmetrically arranged along the first direction, the optical detection module comprises two sensor assemblies arranged along the second direction and symmetrically on two opposite sides of the light emitting module, and each sensor assembly comprises two optical sensors symmetrically disposed on one side of the light emitting module along the first direction.

\* \* \* \* \*